(12) United States Patent
Yakimishyn

(10) Patent No.: US 7,303,201 B2
(45) Date of Patent: Dec. 4, 2007

(54) AIR SUSPENSION SYSTEM FOR A VEHICLE

(76) Inventor: Kelly W. Yakimishyn, 13920-20 Street, Edmonton, Alberta (CA) T5Y 1P8

( * ) Notice: Subject to any disclaimer, the term of this patent is extended or adjusted under 35 U.S.C. 154(b) by 345 days.

(21) Appl. No.: 10/969,474

(22) Filed: Oct. 20, 2004

(65) Prior Publication Data

US 2005/0087948 A1  Apr. 28, 2005

(30) Foreign Application Priority Data

Oct. 22, 2003  (CA) .................................. 2443753

(51) Int. Cl.
*B60G 11/26* (2006.01)
(52) U.S. Cl. ............................................. 280/124.16
(58) Field of Classification Search ............ 280/6.157, 280/5.514, 124.157, 124.16, 124.116, 124.161, 280/86.5
See application file for complete search history.

(56) References Cited

U.S. PATENT DOCUMENTS

| | | | |
|---|---|---|---|
| 4,065,143 A * | 12/1977 | Iida .......................... | 280/43.23 |
| 4,353,393 A | 10/1982 | Schniter | |
| 4,832,141 A * | 5/1989 | Perini et al. ................ | 177/141 |
| 5,037,126 A * | 8/1991 | Gottschalk et al. ... | 280/124.116 |
| 5,120,041 A | 6/1992 | Schniter | |
| 5,121,808 A | 6/1992 | Visentini et al. | |
| 5,161,579 A * | 11/1992 | Anderson, Jr. ........... | 137/627.5 |
| 5,282,644 A | 2/1994 | Larson | |
| 5,299,469 A | 4/1994 | Meyer et al. | |
| 5,447,083 A | 9/1995 | Henderson | |
| 5,489,113 A | 2/1996 | Torborg | |
| 5,601,032 A | 2/1997 | Kosch | |
| 6,225,962 B1 | 5/2001 | Blanchard et al. | |
| 6,273,631 B1 | 8/2001 | Takahashi et al. | |
| 6,283,483 B1 | 9/2001 | Johnson et al. | |
| 6,412,790 B2 * | 7/2002 | McKenzie et al. ....... | 280/6.159 |

OTHER PUBLICATIONS

Gregg Distributors Ltd., Product Catalogue—Air Suspension Products, p. 64-65, at least as early as 2002.

* cited by examiner

*Primary Examiner*—Paul N. Dickson
*Assistant Examiner*—Robert A. Coker
(74) *Attorney, Agent, or Firm*—Davis Bujold & Daniels, P.L.L.C.

(57) ABSTRACT

A height control valve linkage assembly for an air suspension system, including an air bag and a height control valve controlling the supply of air to the air bag. A telescopic linkage is positioned between the arm of the height control valve and the suspension. The linkage is extended to alter the ride height setting of the height control valve, thereby selectively providing additional clearance.

6 Claims, 4 Drawing Sheets

AIR SUSPENSION SYSTEM FOR A VEHICLE

FIELD OF THE INVENTION

This application claims priority from Canadian Application Serial No. 2,443,753 filed Oct. 22, 2003. The present invention relates to an air suspension system adapted for use on a vehicle and, in particular, an air suspension system having variable height control.

BACKGROUND OF THE INVENTION

Air suspension systems utilize height control valves, also known as load levelling valves, to maintain a consistent ride height. The height control valves serve to control an air supply to an associated air bag. Each height control valve has an arm, which is positioned in a horizontal orientation, when the suspension is at a proper ride height. A linkage extends from the arm of the height control valve to the suspension. As the suspension moves up and down the linkage moves the arm, thereby actuating the height control valve to increase or decrease the air supply to the air bag.

There are times, however, when increased clearance is desirable.

SUMMARY OF THE INVENTION

What is required is an air suspension system, which can be readily adapted to vary clearance.

According to the present invention there is provided an air suspension system, including an air bag and a height control valve. The height control valve is disposed between the air bag and an air source. The height control valve has an arm pivotally mounted to the height control valve for up and down movement about a substantially horizontal pivot axis. An axle is supported by a suspension. An extendible linkage extends between the arm of the height control valve and the suspension. When the suspension moves, the linkage causes the arm of the height control valve to pivot in one of an up direction or a down direction to alter the supply of air to the air bag from the air source. Means are provided for selectively extending the linkage to alter the ride height setting of the height control valve to provide additional clearance.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

Figure 1:
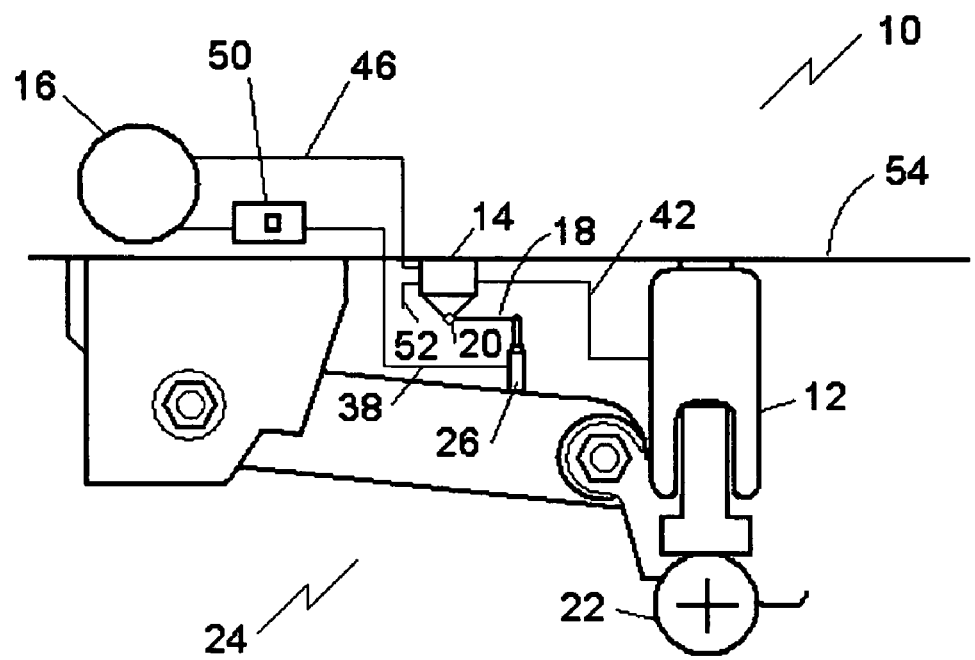
FIG. 1 is a side elevation view of an air suspension assembly constructed in accordance with the teachings of the present invention, with the linkage telescopically retracted.

The preferred embodiment, an air suspension generally identified by reference numeral 10, will now be described with reference to FIGS. 1 and 2.

Figure 2:
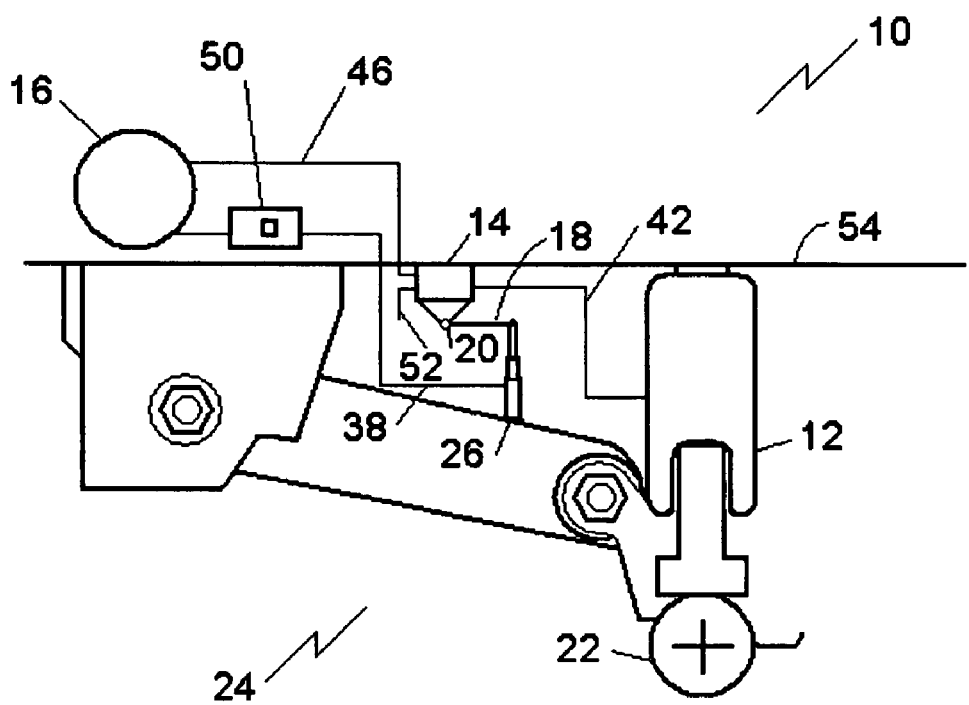
FIG. 2 is a side elevation view of the air suspension assembly illustrated in FIG. 1, with the linkage telescopically extended.
Figure 5:
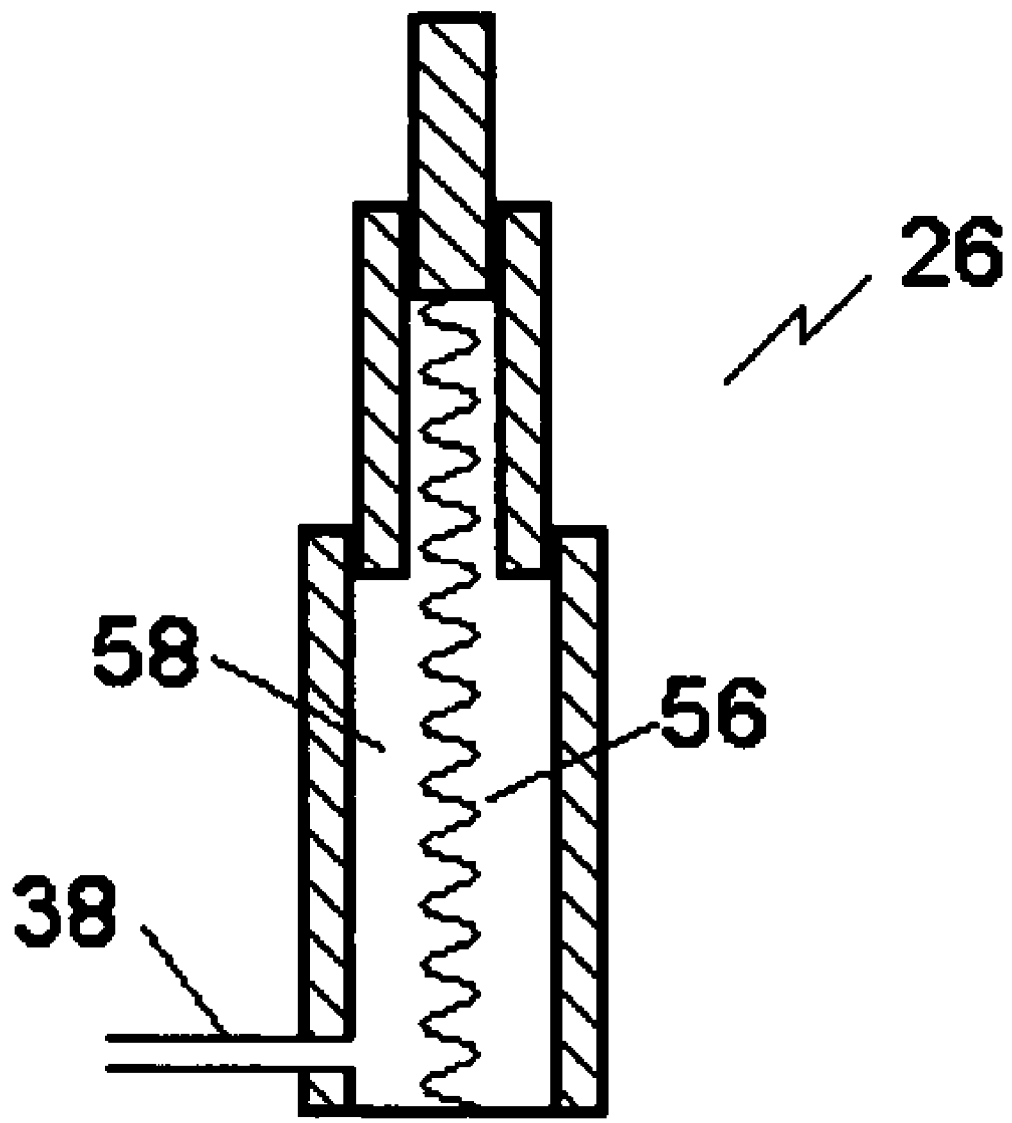
FIG. 5 is a side elevation view, in section of the extendable linkage illustrated in FIG. 1.

Structure and Relationship of Parts:

Referring to FIGS. 1 and 2, air suspension assembly 10 includes an air bag 12, a height control valve 14 disposed between the air bag 12 and an air source 16. The height control valve 14 has an arm 18 pivotally mounted to the height control valve 14 for up and down movement about a substantially horizontal pivot axis 20. The air suspension assembly also includes an axle 22 supported by a suspension 24. A telescopically extendible linkage 26 extends between the arm 18 of the height control valve 14 and the suspension 24, such that when the suspension 24 moves, the linkage 26 causes the arm of the height control valve 14 to pivot in one of an up direction or a down direction to alter the supply of air to the air bag 12 from the air source 16. There is also means for telescopically extending the linkage 26 to alter the ride height setting of the height control valve 14 to provide additional clearance. FIG. 5 depicts the structure of the extendible linkage 26. When line 38 fills the cavity 58 of the linkage with pressurized air, the linkage extends and the spring 56 is stretched. When the air pressure is released, the spring acts to return the linkage to its original position. Referring again to FIGS. 1 and 2, means for selectively extending the extendible linkage 26 are denoted generally by reference numeral 50, and may comprise manual controls, or an automatic control circuit. Manual controls may be a valve that can be opened to supply compressed air to a hydraulically activated linkage. A circuit operated by an operator may open the valve, or the operator may open the valve directly. Automatic controls may comprise a circuit that extends or retracts the linkage upon the occurrence of a predetermined event, or a connection to an air supply that responds to an event occurring.

Operation:

FIG. 1 shows the extendable link retracted. When the controls are activated, the linkage 26 extends, causing the arm 18 to pivot about the pivot axis 20 which in turn causes the height control valve 14 to allow air to flow into the air bag 12. As air flows into the air bag, the surface 54, and the height control valve 14 with it, is raised. Once the desired height is reached, the arm 18 will be horizontally oriented again, and the height control valve 14 will shut off air flow to the air bag. The end result is shown in FIG. 2. When it is desired to return to the normal operating position, the controls lower the linkage 26, which will lower the arm 18 and cause the height control valve 14 to remove air from the air bag 12, such as through an exhaust vent 30. The surface 54 is lowered until the arm 18 is once again horizontal, and the height control valve is turned off.

Figure 3:
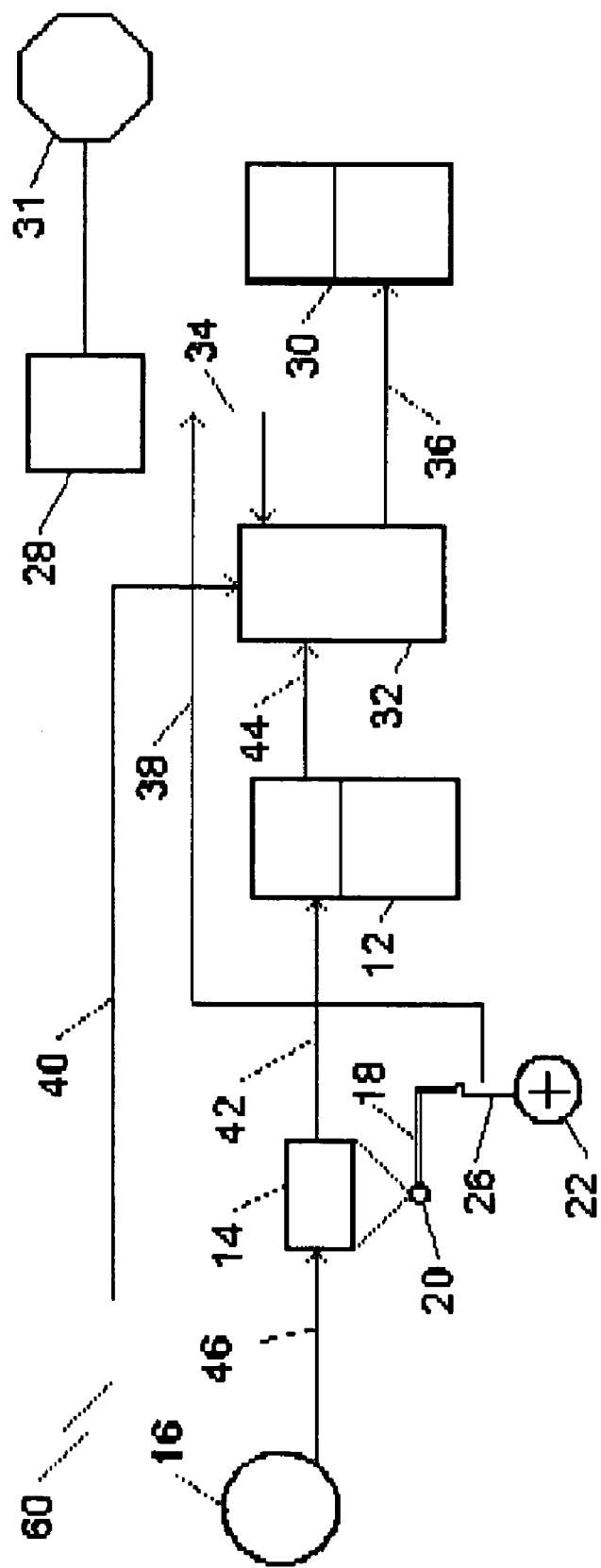
FIG. 3 is a flow diagram that uses the air suspension assembly with a lift axle, with the linkage telescopically retracted.
Figure 4:
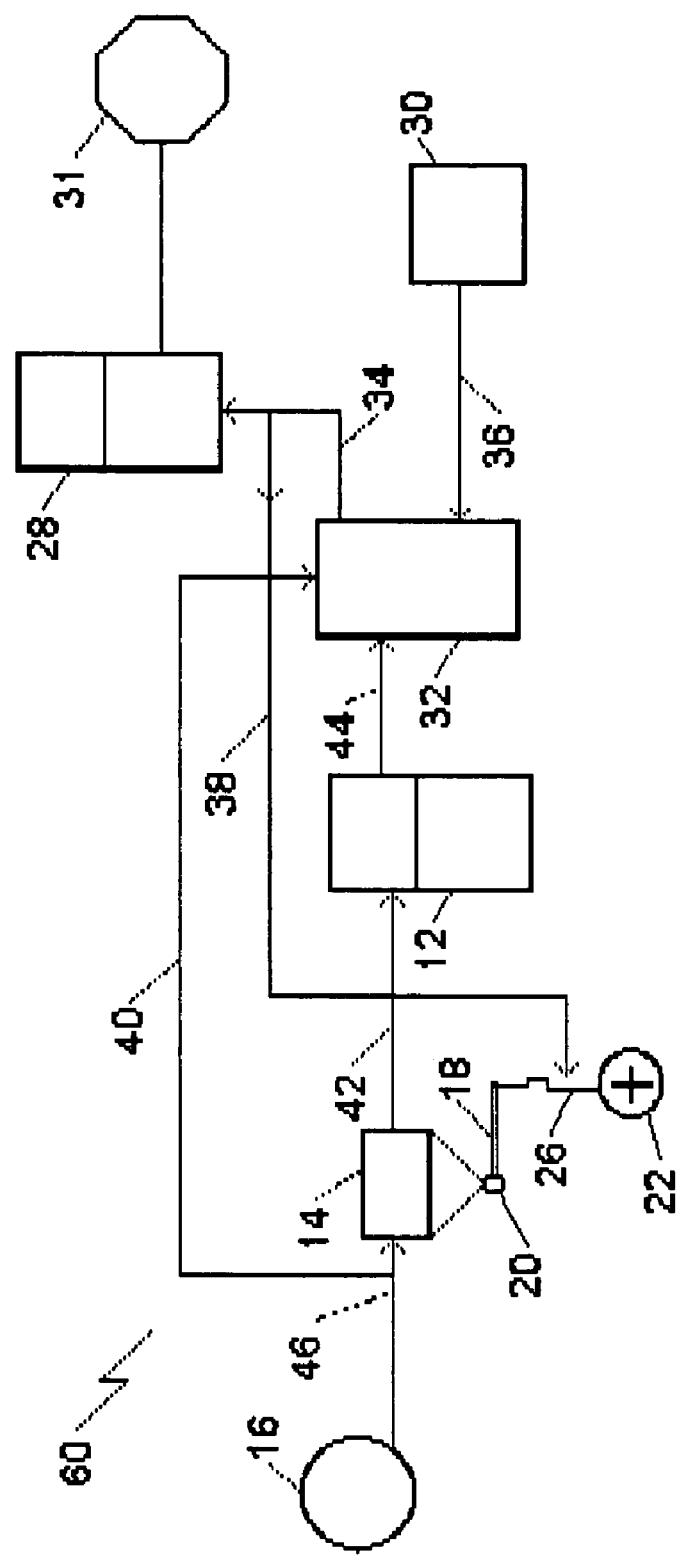
FIG. 4 is a flow diagram that uses the air suspension assembly with a lift axle, with the linkage telescopically extended.

Applications:

An example of using automatic controls is shown in FIGS. 3 and 4, in which a flow diagram of a lift axle system 60 incorporating the air suspension assembly is shown. In this example, the linkage is extended using automatic controls to give more clearance when a lift axle is raised, and lowered to the normal operating position when the lift axle is lowered once again. The linkage 26 is air activated by line 38 such that, as the lift axle is raised, air is supplied by line 34 to a lift bag 28 that raises the lift axle and air is concurrently supplied by line 38 to telescopically extend the linkage 26.

It is to be noted that the illustrated air suspension assembly 10 in FIGS. 3 and 4 includes an exhaust regulator, identified by reference numeral 31. This exhaust regulator 31 is used to exhaust air, so that the lift axle cannot be lifted when the trailer is loaded. For this reason, the configuration shown is referred to as an empty axle assist.

The operation of this example may be seen in FIGS. 3 and 4, which show flow diagrams. In FIG. 3, the lift axle is lowered and the linkage 26 is retracted. Flow 40 is redirected by diverter 32 to where it is required. Flows 34 and 38 show that air is removed from the lift bag 28, shown to be deflated, and the linkage 26, shown to be retracted, respectively. It is to be understood that once the bag is deflated and the linkage is retracted, no more air will flow. When the linkage is retracted, the arm 18 will be lowered and the height control valve 14 will cause the air bag 12 to deflate, reducing the clearance level.

FIG. 4 shows the state of the air suspension assembly when the lift axis is raised, linkage 26 is extended, and lift bag 28 inflated. This state is achieved from FIG. 3 by reversing flows 34 and 38, which will inflate lift bag 28 and extend linkage 26. It is to be understood that once the bag is inflated and the linkage extended, the air flow will be reduced to that which is necessary to maintain this state. When the linkage is extended, the arm 18 will be lifted and the height control valve 14 will cause the air bag 12 to inflate further, giving a higher clearance level.

Other applications for the air suspension system that would use manual control of the linkage include, but are not limited to, raising a truck bed to be level with a loading dock, providing extra clearance over obstacles such as railroad tracks or rocks, or hooking up a trailer to the back of a truck where the trailer is higher than the truck. Instead of lowering the trailer, the truck may be raised to meet the trailer.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

The embodiments of the invention in which an exclusive Property or privilege is claimed are defined as follows:

1. An air suspension assembly for a vehicle, comprising:
    an air bag;
    a height control valve disposed between the air bag and an air source, the height control valve having an arm pivotally mounted to the height control valve for up and down movement about a substantially horizontal pivot axis;
    an axle supported by a suspension;
    an extendible linkage positioned between the arm of the height control valve and the suspension, such that when the suspension moves, the linkage causes the arm of the height control valve to pivot in one of an up direction or a down direction to alter the supply of air to the air bag from the air source; and
    one of manual controls or an automatic control circuit that is activated upon a predetermined event occurring for selectively extending the linkage to alter the ride height setting of the height control valve thereby providing additional clearance.

2. The air suspension assembly as defined in claim 1, wherein the linkage is telescopically extendible.

3. The air suspension assembly as defined in claim 1, wherein extension of the linkage is fluid activated.

4. The air suspension assembly as defined in claim 3, wherein the activating fluid is air.

5. The air suspension assembly as defined in claim 3, wherein a spring is provided to retract the linkage when fluid pressure is released.

6. An air suspension assembly for a vehicle, comprising:
    an air bag;
    a height control valve disposed between the air bag and an air source, the height control valve having an arm pivotally mounted to the height control valve for up and down movement about a substantially horizontal pivot axis;
    an axle supported by a suspension;
    a telescopically extendible air activated linkage positioned between the arm of the height control valve and the suspension, such that when the suspension moves, the linkage causes the arm of the height control valve to pivot in one of an up direction or a down direction to alter the supply of air to the air bag from the air source, a spring acting upon the linkage to retract the linkage when air pressure is released; and
    manual controls for selectively controlling a supply of air to the linkage from an air source to telescopically extend the linkage to alter the ride height setting of the height control valve thereby providing additional clearance.

* * * * *